United States Patent [19]
Guasti

[11] 3,963,207

[45] June 15, 1976

[54] ADJUSTABLE SUPPORT LEG

[76] Inventor: Peter C. Guasti, 48 Crescent Ave., Cliffside Park, N.J. 07010

[22] Filed: Sept. 16, 1974

[21] Appl. No.: 506,041

[52] U.S. Cl. ............................... 248/168; 248/188.5
[51] Int. Cl.² ......................................... F16M 11/38
[58] Field of Search ........ 248/161, 411, 413, 188.5, 248/168, 172, 173

[56] References Cited
UNITED STATES PATENTS

| | | | |
|---|---|---|---|
| 1,863,761 | 6/1932 | Neuwirth | 248/188.5 |
| 2,442,000 | 5/1948 | Furnas | 248/188.5 |
| 2,519,549 | 8/1950 | Coutant et al. | 248/188.5 |
| 2,668,682 | 2/1954 | Dalton | 248/188.5 |

*Primary Examiner*—Roy D. Frazier
*Assistant Examiner*—Darrell Marquette
*Attorney, Agent, or Firm*—Philip Furgang

[57] ABSTRACT

A tripod leg is provided which distributes a portion of the forces produced by the supported object. These forces are directed substantially away from the means used to releasably hold the relatively movable members. Thus, a pair of parallel rods of a leg are separated by a first and second spacer. A third rod is attached to one spacer and extends between two parallel rods. A lower hollow member of the leg is inserted through a hole in the lowermost spacer and engages the third rod. Secured to the lower rod is a collar having a screw means for engaging and releasably holding the third rod.

9 Claims, 8 Drawing Figures

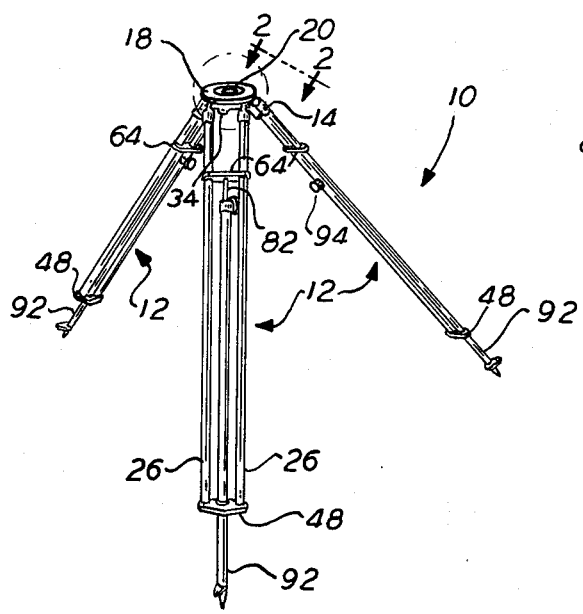
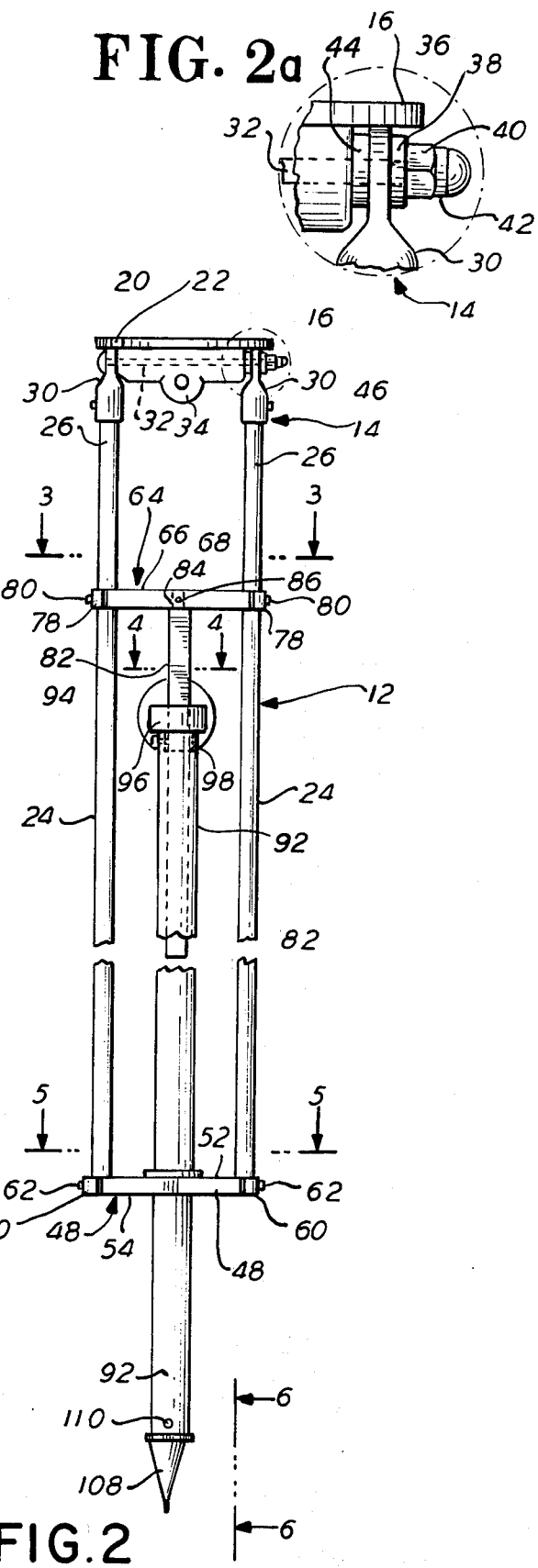
FIG. 1a
FIG. 1
FIG. 2a
FIG. 2

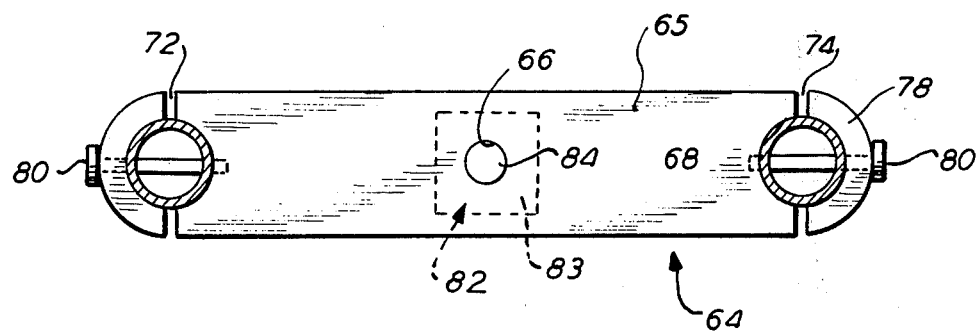
FIG. 3
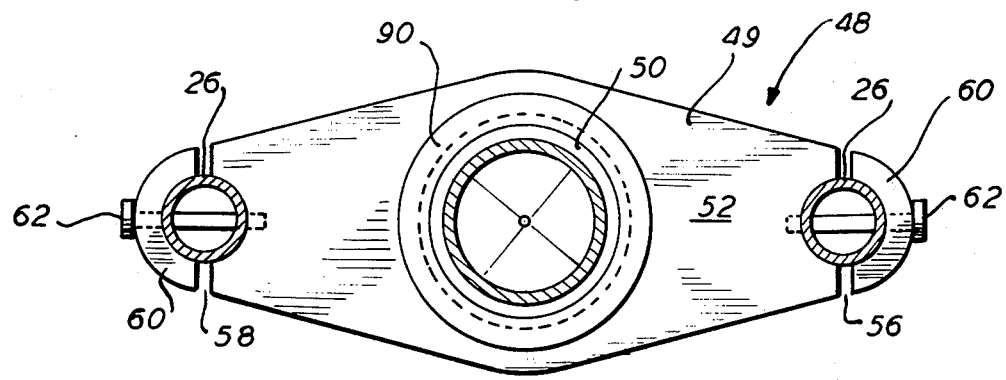
FIG. 5
FIG. 4
FIG. 6
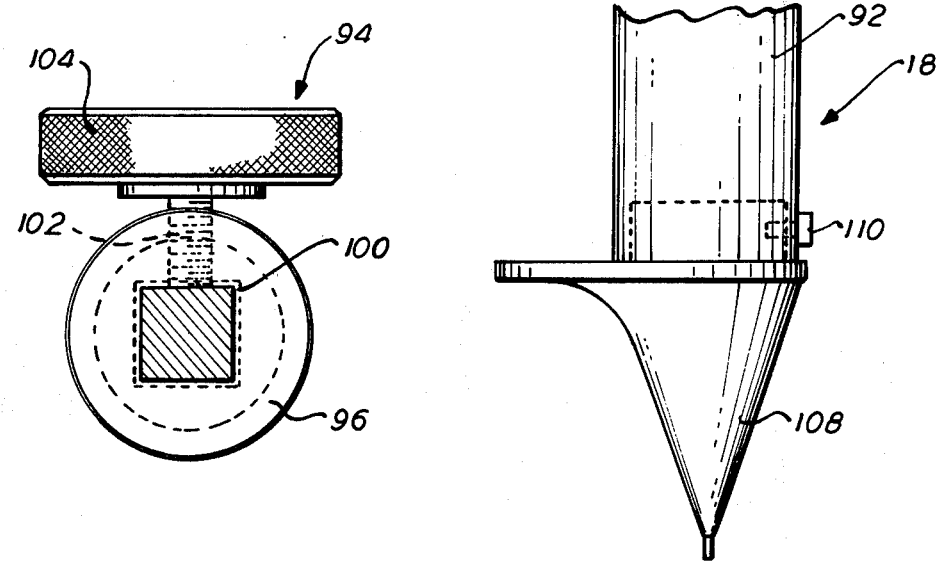

ADJUSTABLE SUPPORT LEG

BACKGROUND OF THE INVENTION

This invention relates to an adjustable support leg and, more particularly, to legs used in connection with tripods and similar devices. It is understood that tripods are generally employed to support cameras, optical instruments, antenna, and the like.

Numerous suggested constructions for support legs for tripods and the like have been suggested over the years. The major desired attributes of such devices are stability and ease of adjustment. One suggested device has been provided by Grimal in U.S. Pat. No. 2,940,708. Grimal proposes tripod legs made of channeled or transversely arcuate members, with each leg comprising two telescoping members. The lower member of each leg is intended to be movable with respect to the upper member so as to adjust the relative height of the tripod. A clamping means is provided at the lower end of the upper member. This clamping means is used to engage and releasably join the two members together to thereby form each tripod leg.

Still another suggested device is set forth by Wittel in U.S. Pat. No. 2,019,753. Wittel suggests tripod legs having two telescoping members. The lower member engages, within the upper member, an expansible nut. The lower member portion is adjusted by relieving the nut, moving the lower member with respect to the upper member, and expanding the nut by rotating the lower member threaded therein.

Still another device of this nature is suggested by Dalton in U.S. Pat. No. 2,668,682. The device suggested by Dalton comprises tripos legs in which the upper member of each leg is an inverted A-frame with the lower member inserted through a bore recess at the apex of the A. The assembly is secured by a narrowing or tightening of the diameter of the bore by means of a hand knob. Additional support is provided by a spider secured to the center of the tripod seat and at the apex of each A-frame leg.

Still another device of this type, intended to overcome the problems of support and stability, is revealed by Mercier, Son in U.S. Pat. No. 765,980. This device has an upper member of a tripod which has a substantially rectangular shape and has a transverse slot. A lower rectangular member is secured to the rear of the upper member by means of a threaded screw, a wing nut, and a washer. The wing nut is tightened against the washer which pulls the two members against one another.

The prior art devices have a number of obvious disadvantages. First, in most of the devices it is apparent that the entire weight of the supported object is directed against the means for joining the upper and lower members. If a heavy object such as a motion picture or television camera was supported on the tripod over a long period of time, the constant weight upon the means for joining might cause the joined members to move with respect to one another. Thus, for example, the device by Dalton focuses the weight of the object supported by the tripod at the bore or apex of the A-frame. The devices of Wittel, Grimal, and Mercier, Son similarly provide that the weight of the object be borne at the point of joining the two members.

It should also be noted that the devices of the type suggested by Wittel, Dalton, and Grimal must be adjusted at the base or footing which is certainly inconvenient. Furthermore, the Wittel device must be adjusted by lifting the entire tripod and rotating the lower member with respect to the upper member.

An additional inconvenience is provided by the device suggested by Mercier, Son. Loosening the wing nut would cause the two members to pivot at the screw, further disorienting the entire tripod.

SUMMARY OF THE INVENTION

In view of the foregoing, it is an object of this invention to provide a leg support for use in connection with such devices as tripods.

It is another object of this invention to provide a leg support that distributes the weight of the object supported so that only a portion of the weight bears against the means for joining the relatively movable members of the leg.

It is still another object of this invention to provide an adjustable height leg for use in connection with such devices as tripods, in which the adjustment is made at the uppermost part of the lower supporting member.

It is still a further object of this invention to provide a leg support for tripods which is economical in manufacture and simple in use.

In fulfillment of these objectives, and others as may become more apparent with reference to the drawing, specification, and claims herein, it is intended to provide a support leg suitable for use in connection with such devices as tripods. It is generally known that tripods have a seat or other device for holding cameras or the like. The tripod may have bosses or similar means for pivotally joining the legs. Each support leg comprises a pair of spaced rod-like members being pivotally securable to the tripod bosses. At least two means for spacing the rods are provided. The first spacing means is secured to the pair of rods substantially at the ends thereof. The first spacer has an aperture. The second spacing means are secured and space apart the rod-like members intermediate the first spacer and the pivotally securable ends of the rods. A third rod-like member is disposed between the pair of rod-like members and secured to the second spacer means and disposed between the first and second spacer means. A fourth rod-like member is insertable through the aperture and between the first and second spacer means and the pair of rod-like members. Engaging means are provided for releasably securing the fourth rod and third rod. The fourth rod extends without the first spacer to serve as an adjustable support for the tripod.

BRIEF DESCRIPTION OF THE DRAWING

FIG. 1 is a perspective view of a tripod constructed in accordance with the teachings of this invention;

FIG. 1a. is a partial sectional perspective view of the tripods of FIG. 1;

FIG. 2 is a partial front view of a leg support of FIG. 1 taken along line 2—2;

FIG. 2a. is a partial sectional view of the tripod of FIG. 2;

FIG. 3 is a partial sectional view of the leg of FIG. 2 taken along lines 3—3;

FIG. 4 is a partial sectional view of the leg of FIG. 2 taken along lines 4—4;

FIG. 5 is a partial sectional view of the leg of FIG. 2 taken along lines 5—5; and FIG. 6 is a partial sectional view of the leg of FIG. 2 looking in the direction of the view along lines 6—6.

DESCRIPTION OF THE PREFERRED EMBODIMENTS

Disclosed herein is a support leg for a tripod device or the like. Thus, with reference to the drawing, there is described a tripod 10 (FIG. 1) which embodies the invention and includes three leg assemblies, indicated generally by the reference character 12. The leg assemblies 12 are pivotally secured at the upper ends 14 to a common central body 16 and terminates at the lower end in a foot 18.

The central body 16 may be one that is commonly known in the art and, as disclosed, may generally have a disc-like shape for holding such apparatus as a television camera, motion picture camera, or other equipment (not shown). Thus, the body 16 may be formed with upstanding flange 18 at the periphery thereof. Centrally disposed in the body 16 may be a hole 20 for accommodating the equipment. Thus, equipment may be rested upon the central body 16 and be oriented with respect to a key way 22, at a predetermined point in the flange 18 in order to be uniformly aligned and secured to the tripod, such equipment having an appropriately positioned key in the base thereof.

Turning now to more detailed discussion of the tripod 10, each leg assembly 12 comprises a pair of rod-like members 24. The pair of members 24 may take any convenient shape as, for example, tubular. The members 24 may be made of any structural material such as aluminum, magnesium, or the like. The upper ends 14 of the tubular members 24 may be surmounted by a hollow tubular cap 26, each having a flattened end 30. An aperture (not visible) may extend transversely through the flattened end 30. This cap aperture is intended to receive a pivot rod 32 (shown in phantom in FIG. 2).

The pivot rod 32 is disposed within bosses 34 of the central body 16. These bosses 34 are placed at appropriate positions at the periphery of the central body 16 so as to accommodate three of the leg assemblies 12. The pivot rod 32 may extend coaxially within the cylindrical bosses 34 and without the ends thereof and through the apertures in the flattened end 30 of the caps 26. Each of the flattened ends are held against planar end surfaces 36 of the bosses 34 by any convenient means such as a washer 38, nut 40, and acorn nut 42. If desired, a washer 44 may be disposed between the flattened end 30 and the planar end surface 36 of the bosses 34 to provide a frictional engagement and provide some resistance to the pivotal movement of the leg assembly 12.

The cap 26, which may be made of any structural material such as aluminum or magnesium as is the remainder of the legs 24, may be secured to the leg 24 as by any joining means such as a screw 46. It is clear that the pivotal joining of the leg assembly 12 to the body 16 may be done by any convenient means such as by rivets or the like, and the use of a rod 32 is merely a preferred construction thereof. So, too, with the joining of the cap 28 to the leg 26 may be done by welding, soldering, or formed as an integral part thereof.

A first spacing means 48 may be connected to each of the members 26. As previously indicated, the members 26 are preferably hollow cylindrical rods. The spacer 48, which may be made of aluminum or other structural material, may have a body portion 49 comprising a substantially diamond-like shape (FIG. 5). Centrally disposed in this first spacer 48 may be an aperture 50 which may have, for example, a generally cylindrical shape and extend through from one planar side 52 to the other planar side 54 of the first spacer 48. This aperture 50 may be centrally disposed.

The opposed ends 56 and 58 of the diamond-shaped body portion 49 may be cut off or frusto-shaped and have therewithin a concavity for accommodating a part of the cylindrical surface of the tubular members 26. Arcuate members 60 may be joined to complete the first spacer 48 and enclose the tubes 26. A joining means such as a self taping screw 62, may pass through each arcuate member 60, the rods 26, and into the adjacent end 56 or 58 of the body part 49 to secure the rods 26 to the spacer 48.

Spaced intermediate the central body 16 and the first spacer 48 may be a second spacer 64. The spacer (FIG. 3) may take any convenient shape and is preferably a generally rectangular shaped body portion 65 with a centrally disposed aperture 66 extending from one planar surface 68 through to the other planar surface 70. The opposed ends 72 and 74 of the body part 65 of the second spacer 64 may have therein concavities to accommodate a portion of the cylindrical surface of the tubes 26. The remainder of the tubes may be enclosed by arcuate members 78. The entire structure may be fastened together by any joining means such as a screw 80, passing transversely through the arcuate member 78, the tube 26, and into the body part 65 of the second spacer 64.

The tubes 26 are preferably parallel one another and held rigidly with respect to one another by the first and second spacer 48 and 64, respectively. A third rod-like member 82 may have any desirable shape. Preferably, this third rod 82 may have a generally square cross-section. This square rod 82 may have extending from one end 83 a smaller cylindrical stem 84. The stem 84 may be formed as an integral part of the rod-like member 82 which in turn may be made of any structural material such as aluminum, magnesium, or the like. The stem 84 is insertable within the aperture 66 of the second spacer 64. The square rod 82 may be so disposed as to extend parallel the tubular pair of rods 26 and between the first and second spacers 48 and 64, respectively. The stem 84 may be secured within the aperture 68 of the second spacer 64 by means of a rivet 86 extending transversely through the stem 84 and second spacer 64. The square rod 82 will extend but be preferably spaced from the first spacer 48. A sleeve 88 (FIGS. 1 and 5) having a laterally extending flange 90, is within the aperture 50 of the first spacer 48. The flange 90 is supported by the upper surface 52 of the first spacer 48. A fourth rod-like member 92 which may, for example, have a cylindrical configuration, extends through the first spacer aperture 50 and sleeve 88. The fourth member 92 is preferably hollow and open at one end to engage the square rod 82. Secured at the top end of the fourth rod 92 may be means 94 for securing the fourth rod 92 to the square rod 82. This means 94 may comprise, for example, a knurled collar 96 which in turn has a downwardly extending neck 98. The collar 96 and neck 98 have an aperture 100 (FIG. 4) for receiving the third rod 82. This aperture 100 may take any convenient shape and preferably conform to the shape of the third rod 82. Thus, the aperture has a square cross-section for receiving therethrough the square rod 82. Extending transversely through the collar 96 may be a screw 102 secured to a knurled knob 104. The collar 96 may be appropriately threaded to accommodate the screw 102. The knurled knob 104 may be secured to the screw 102 by means of welding or riveting (not shown).

The neck 98 of the collar 96 is insertable within the fourth rod 92 and secured by any means such as a screw 106.

The foot 18 (FIG. 6) of the leg assembly 12 comprises an inverted cone 108 as is well known in the art, and secured by any joining means such as a screw 110 to the end of the cylindrical fourth rod 92.

In operation, it will be appreciated that the leg assembly 12 may be positioned at any angle with respect to the central body 16. The weight of the camera or other device supported by this central body 16 is distributed along the parallel rods 26. A substantial part of the weight is believed to be carried by the first spacer 48 against the fourth rod 92 at the base of bottom of the assembly 12. The second spacer 64 carries a proportionate part of the weight of the carried object which is then distributed along the square rod 82 and fourth rod 92.

Thus, the major forces provided by the weight of the object on the central body 16 is not carried at the means 94 for joining of the adjustable lower member 92 to the upper member 82. This is most significant in that because a substantial amount of the forces produced by the weight of the equipment is distributed to the first spacer 48.

The collar 96 provides a bearing surface against which the cylindrical rod 82 must move when it is being adjusted. For that reason, the collar 90 is preferably of a nylon or other material that would ease the relative movement of the two members. The user would release the knurled knob 104, the screw 102 of which is engaging the square rod 82. The fourth rod 92 may then be moved up or down as desired along the square rod 82 to accommodate the proper position and then tightened. Thus, there is provided a more equal distribution of the weight and a more convenient method of adjusting the overall height of the tripod 10. It will be seen that the knurled knob 104 is at the uppermost portion of the assembly 12. Thus, it is possible to adjust the overall position of the tripod 10 without having to reach down to the very base of the leg assembly 12 in order to provide such adjustment. This provides an additional convenience as well as more equal distribution of the weight amongst the various members.

It is to be understood that the relative position of the spacers 48 and 64 are for the preferred use. These spacers 48 and 64 may, however, be located in any other desired position along the rods 26. Thus, reference herein to the first spacer 48 being located at one end of the rods 26 is only by way of a general relative location and should not interpreted as being strictly at the very end of the rod 26.

What is claimed:

1. A support leg of the type used as part of a tripod, said tripod having a seat with leg engaging bosses extending therefrom, said leg comprising:
    a. a pair of spaced, rod-like members being pivotally securable at one end to the tripod bosses;
    b. first spacer means secured to said rod-like members substantially at the end opposed to said end being pivotally securable and having an aperture therethrough;
    c. second spacer means secured to said rod-like members intermediate said first spacer and said pivotal end;
    d. a third rod-like member secured to said second spacer and disposed between said first and second spacers and said pair of rod-like members;
    e. a fourth rod-like member slidable through said aperture and engaging said third rod-like member between said first and second spacers and said pair of rod-like members, the end of said fourth rod-like member extending beyond said pair of rod-like members and said first and second spacers and comprising foot means for standing said leg against the ground; and
    f. engaging means located between said first and second spacer means for adjustably securing said third rod to said fourth rod.

2. A leg as recited in claim 1, wherein said engaging means comprises a clamp secured at the end of said fourth rod disposed between said first and second spacers, and being releasably tightenable against said third rod to prevent relative movement between said fourth rod and said third rod, thereby securing the leg.

3. A leg as recited in claim 2, wherein said third rod and said pair of rods lie substantially in the same plane.

4. A leg as recited in claim 3, wherein said pair of rods are parallel to one another.

5. A leg as recited in claim 4, wherein said third rod extends parallel to said pair of parallel rods.

6. A leg as recited in claim 5, wherein said fourth rod is hollow and receives therewithin said third rod.

7. A leg as recited in claim 6, wherein said engaging means comprises a collar, said collar having an aperture therein for receiving therethrough said third rod, and holding said third rod substantially in place with respect to said fourth rod.

8. A leg as recited in claim 7, wherein said collar has a screw receiving aperture extending therethrough and capable of communicating with said third rod, said engaging means further comprises a screw for passing through said threaded aperture to engage and releasably hold said third and fourth rods together.

9. A leg as recited in claim 8, wherein said pair of rods are cylindrical;
    said third rod has a substantially rectangular cross-section;
    said first spacer being substantially diamond-shaped with one pair of opposed apices thereof being concave for receiving said pair of rods and arcuate members for substantially enclosing said cylindrical pair of rods, fastening means for securing said arcuate members, rods, and diamond-shaped portion together;
    said second spacer comprises a substantially rectangular member having opposed concave ends for receiving said pair of cylindrical rods and arcuate members for enclosing said parallel rods, fastening means for securing said arcuate members, said rods and said rectangular member together.

* * * * *